United States Patent
Momoda et al.

(10) Patent No.: US 6,973,701 B2
(45) Date of Patent: Dec. 13, 2005

(54) RELEASABLE FASTENING SYSTEM BASED ON IONIC POLYMER METAL COMPOSITES AND METHOD OF USE

(75) Inventors: Leslie A. Momoda, Los Angeles, CA (US); Alan Lampe Browne, Grosse Pointe, MI (US); Nancy L. Johnson, Northville, MI (US); William Barvosa-Carter, Ventura, CA (US); Thomas B. Stanford, Port Hueneme, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/360,997

(22) Filed: Feb. 7, 2003

(65) Prior Publication Data

US 2004/0074070 A1 Apr. 22, 2004

Related U.S. Application Data

(63) Continuation-in-part of application No. 10/273,691, filed on Oct. 19, 2002.

(51) Int. Cl.⁷ .............................................. A44B 18/00
(52) U.S. Cl. ......................... 24/442; 24/603; 428/100
(58) Field of Search ....................... 24/442, 446, 447, 24/448, 450, 451, 452, 603; 428/100, 99

(56) References Cited

U.S. PATENT DOCUMENTS

| | | | |
|---|---|---|---|
| 2,717,437 A * | 9/1955 | De Mestral George | 428/92 |
| 2,994,117 A | 8/1961 | McMullin | 24/201 |
| 3,101,517 A * | 8/1963 | Fox et al. | 24/442 |
| 3,128,514 A | 4/1964 | Parker et al. | 24/11 HC |
| 3,138,749 A | 6/1964 | Slibitz | 318/135 |
| 3,176,364 A | 4/1965 | Dritz | 24/306 |
| 3,292,019 A | 12/1966 | Hsu et al. | 310/328 |
| 3,365,757 A | 1/1968 | Billarant | 24/442 |
| 3,469,289 A * | 9/1969 | Whitacre | 24/450 |
| 3,490,107 A * | 1/1970 | Brumlik | 24/451 |
| 3,808,648 A * | 5/1974 | Billarant et al. | 24/450 |
| 4,169,303 A | 10/1979 | Lemelson | 24/452 |
| 4,382,243 A | 5/1983 | Babitzka et al. | 335/219 |
| 4,391,147 A | 7/1983 | Krempl et al. | 73/730 |
| 4,634,636 A * | 1/1987 | Yoshino et al. | 428/500 |
| 4,637,944 A | 1/1987 | Walker | 428/35 |
| 4,642,254 A | 2/1987 | Walker | 428/36 |
| 4,693,921 A | 9/1987 | Billarant et al. | 428/100 |

(Continued)

FOREIGN PATENT DOCUMENTS

DE 199 56 011 6/2001

(Continued)

*Primary Examiner*—Jack W. Lavinder
(74) *Attorney, Agent, or Firm*—Kathryn A. Marra

(57) ABSTRACT

A releasable fastening system comprises a knob portion comprising a knob element, a cavity portion comprising a cavity configured to receive the knob element, and an ionic polymer metal composite actuator disposed at the knob element. The ionic polymer metal composite actuator is operable to mechanically interlock the knob element with the cavity. A method of operating a releasable fastening system comprises contacting a knob portion with a cavity portion to form a releasable engagement, wherein the knob portion comprises a knob element disposed on a first support, and wherein the cavity portion comprises a cavity disposed at a second support; maintaining constant shear forces and constant pull-off forces between the knob portion and the cavity portion; and activating an ionic polymer metal composite actuator at the knob portion to facilitate the interlocking of the knob portion and the cavity portion.

16 Claims, 2 Drawing Sheets

U.S. PATENT DOCUMENTS

| | | | |
|---|---|---|---|
| 4,752,537 A | 6/1988 | Das | 428/614 |
| 4,775,310 A | 10/1988 | Fischer | 425/308 |
| 4,794,028 A | 12/1988 | Fischer | 428/100 |
| 4,931,344 A | 6/1990 | Ogawa et al. | 428/100 |
| 5,037,178 A | 8/1991 | Stoy et al. | 385/53 |
| 5,071,363 A | 12/1991 | Reylek et al. | 439/291 |
| 5,133,112 A | 7/1992 | Gomez-Acevedo | 24/450 |
| 5,136,201 A | 8/1992 | Culp | 310/328 |
| 5,182,484 A | 1/1993 | Culp | 310/328 |
| 5,191,166 A | 3/1993 | Smirlock et al. | 89/36.02 |
| 5,212,855 A * | 5/1993 | McGanty | 24/452 |
| 5,284,330 A | 2/1994 | Carlson et al. | 267/140.14 |
| 5,312,456 A | 5/1994 | Reed et al. | 24/442 |
| 5,319,257 A | 6/1994 | McIntyre | 310/328 |
| 5,328,337 A | 7/1994 | Kunta | 417/310 |
| 5,474,227 A | 12/1995 | Krengel et al. | 228/147 |
| 5,486,676 A | 1/1996 | Aleshin | 219/121.63 |
| 5,492,534 A | 2/1996 | Athayde et al. | 604/141 |
| 5,497,861 A | 3/1996 | Brotz | 188/267 |
| 5,547,049 A | 8/1996 | Weiss et al. | 188/267 |
| 5,611,122 A * | 3/1997 | Torigoe et al. | 24/442 |
| 5,656,351 A | 8/1997 | Donaruma | 428/100 |
| 5,657,516 A * | 8/1997 | Berg et al. | 24/452 |
| 5,669,120 A | 9/1997 | Wessels et al. | 24/446 |
| 5,671,498 A | 9/1997 | Martin et al. | 15/244.3 |
| 5,712,524 A | 1/1998 | Suga | 310/328 |
| 5,725,928 A | 3/1998 | Kenney | 428/100 |
| 5,797,170 A | 8/1998 | Akeno | 24/452 |
| 5,798,188 A | 8/1998 | Mukohyama et al. | 429/34 |
| 5,814,999 A | 9/1998 | Elie et al. | 324/662 |
| 5,816,587 A | 10/1998 | Stewart et al. | 280/5.516 |
| 5,817,380 A * | 10/1998 | Tanaka | 428/100 |
| 5,885,652 A | 3/1999 | Abbott et al. | 427/163.2 |
| 5,945,193 A | 8/1999 | Pollard et al. | 428/100 |
| 5,969,518 A | 10/1999 | Merklein et al. | 324/173 |
| 5,974,856 A | 11/1999 | Elie et al. | 73/11.04 |
| 5,979,744 A | 11/1999 | Brigleb | 229/87.01 |
| 5,983,467 A | 11/1999 | Duffy | 24/442 |
| 6,029,783 A | 2/2000 | Wirthlin | 188/267.1 |
| 6,086,599 A | 7/2000 | Lee | 606/108 |
| 6,102,912 A | 8/2000 | Cazin et al. | 606/61 |
| 6,102,933 A | 8/2000 | Lee et al. | 606/209 |
| 6,129,970 A | 10/2000 | Kenney et al. | 428/100 |
| 6,148,487 A | 11/2000 | Billarant | 24/442 |
| 6,156,842 A | 12/2000 | Hoenig et al. | 525/171 |
| 6,203,717 B1 | 3/2001 | Munoz et al. | 252/62.52 |
| 6,257,133 B1 | 7/2001 | Anderson | 100/162 B |
| 6,388,043 B1 | 5/2002 | Langer et al. | 528/80 |
| 6,454,923 B1 | 9/2002 | Dodgson et al. | 204/415 |
| 6,460,230 B2 | 10/2002 | Shimamura et al. | 24/452 |
| 6,502,290 B1 | 1/2003 | Tseng | 28/161 |
| 6,544,245 B2 | 4/2003 | Neeb et al. | 24/442 |
| 6,546,602 B1 * | 4/2003 | Eipper et al. | 24/442 |
| 6,593,540 B1 | 7/2003 | Baker et al. | 219/121.63 |
| 6,598,274 B1 | 7/2003 | Marmaropoulos | 24/451 |
| 6,605,795 B1 | 8/2003 | Arcella et al. | 219/121.63 |
| 6,628,542 B2 | 9/2003 | Hayashi et al. | 365/158 |
| 6,681,849 B2 | 1/2004 | Goodson | 166/66.5 |
| 6,740,094 B2 | 5/2004 | Maitland et al. | 606/108 |
| 6,742,227 B2 | 6/2004 | Ulicny et al. | 24/442 |
| 6,766,566 B2 | 7/2004 | Cheng et al. | 24/452 |
| 6,797,914 B2 | 9/2004 | Speranza et al. | 219/121.64 |
| 6,815,873 B2 | 11/2004 | Johnson et al. | 310/331 |
| 2002/0007884 A1 | 1/2002 | Shuster | 148/654 |
| 2002/0050045 A1 | 5/2002 | Chiodo | 29/426.5 |
| 2002/0062547 A1 | 5/2002 | Chiodo et al. | 29/426.5 |
| 2002/0076520 A1 | 6/2002 | Neeb et al. | 428/100 |
| 2002/0142119 A1 | 10/2002 | Seward et al. | 428/36.9 |
| 2003/0120300 A1 | 6/2003 | Porter | 606/191 |
| 2004/0025639 A1 * | 2/2004 | Shahinpoor et al. | 75/722 |
| 2004/0033336 A1 * | 2/2004 | Schulte | 428/100 |
| 2004/0074061 A1 | 4/2004 | Ottaviani et al. | 24/442 |
| 2004/0074062 A1 | 4/2004 | Stanford et al. | 24/442 |
| 2004/0074063 A1 | 4/2004 | Golden et al. | 24/442 |
| 2004/0074064 A1 | 4/2004 | Powell et al. | 24/442 |
| 2004/0074067 A1 | 4/2004 | Browne et al. | 24/442 |
| 2004/0074068 A1 | 4/2004 | Browne et al. | 24/442 |
| 2004/0074069 A1 | 4/2004 | Browne et al. | 24/442 |
| 2004/0074071 A1 | 4/2004 | Golden et al. | 24/442 |
| 2004/0117955 A1 | 6/2004 | Barvosa-Carter et al. | 24/442 |

FOREIGN PATENT DOCUMENTS

| | | |
|---|---|---|
| EP | 0385443 | 9/1990 |
| EP | 0673709 | 9/1995 |
| EP | WO0245536 A2 * | 6/2002 |
| JP | 401162587 | 6/1989 |
| JP | 4-314446 | 4/1992 |
| JP | 4-266970 | 9/1992 |
| JP | 08260748 | 10/1996 |
| WO | WO 99/42528 | 8/1999 |
| WO | WO 00/62637 | 10/2000 |
| WO | WO 01/84002 | 11/2001 |
| WO | WO 02/45536 | 6/2002 |

* cited by examiner

RELEASABLE FASTENING SYSTEM BASED ON IONIC POLYMER METAL COMPOSITES AND METHOD OF USE

CROSS REFERENCE TO RELATED APPLICATIONS

This application is a Continuation-in-Part of U.S. application Ser. No. 10/273,691 filed Oct. 19, 2002.

BACKGROUND

This disclosure relates to releasable attachment devices of the type used to fasten, retain, or latch together components of an apparatus or a structure that are to be separated or released under controlled conditions.

Hook and loop type separable fasteners are used to detachably join a plurality of members to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relative to each other in a direction parallel to their plane of contact. The term "pull force" refers to an action or stress resulting from applied forces that causes or tends to cause two contiguous parts of a body to move relative to each other in a direction normal to the plane of contact of the parts.

SUMMARY

Disclosed herein is a releasable fastening system. The system comprises a knob portion comprising a knob element, a cavity portion comprising a cavity configured to receive the knob element, and an ionic polymer metal composite actuator disposed at the knob element. The ionic polymer metal composite actuator is operable to mechanically interlock the knob element with the cavity. In another embodiment, a releasable fastening system comprises a knob portion comprising a knob element and a first support member at which the knob element is supported or attached, a cavity portion comprising a cavity configured to receive the knob element and a second support member at which the cavity is disposed, and an ionic polymer metal composite actuator disposed at the knob element. The ionic polymer metal composite actuator comprises a solid polymer electrolyte material and first and second electrodes disposed at the solid polymer electrolyte material. The ionic polymer metal composite actuator is furthermore electrically operable to engage a surface of the cavity to retain the knob element at the cavity.

In yet another embodiment, a releasable fastening system comprises a knob portion comprising an ionic polymer metal composite actuator and a cavity portion comprising a cavity configured to receive the ionic polymer metal composite actuator of the knob portion. The ionic polymer metal composite actuator comprises a solid polymer electrolyte material and first and second electrodes disposed thereat.

A method of operating a releasable fastening system comprises contacting a knob portion with a cavity portion to form a releasable engagement, wherein the knob portion comprises a knob element disposed on a first support, and wherein the cavity portion comprises a cavity disposed at a second support; maintaining constant shear forces and constant pull-off forces between the knob portion and the cavity portion; and activating an ionic polymer metal composite actuator at the knob portion to facilitate the interlocking of the knob portion and the cavity portion.

The above-described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
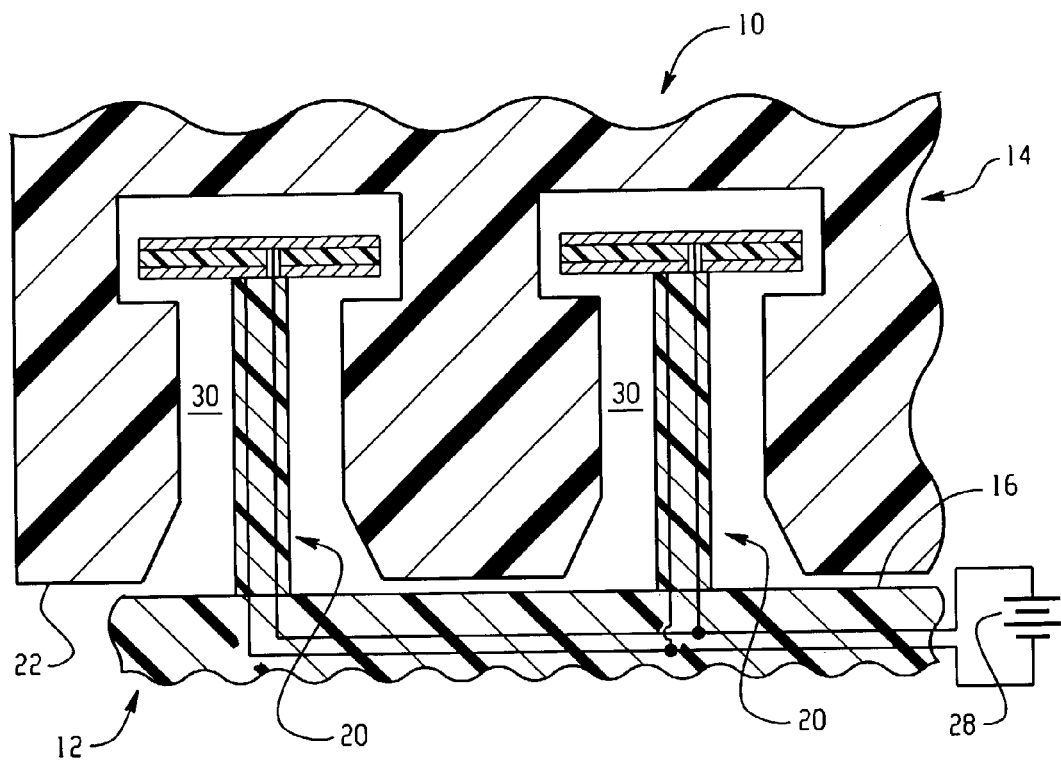
FIG. 1 is a schematic representation of a releasable fastening system.

Referring now to FIG. 1, one exemplary embodiment of a releasable fastening system is shown generally at 10 and is hereinafter referred to as "system 10." System 10 provides for a controlled engagement and mechanical interlocking of surfaces via the activation of ionic polymer metal composite (IPMC) elements. System 10 also provides a method for the attachment of the surfaces. In particular, the application of an electrical voltage to the ionic polymer metal composite provides for the on-demand remote engagement and disengagement of various facial surfaces including, but not limited to, joints and other points of attachment.

System 10 comprises a knob portion generally designated 12 and a cavity portion generally designated 14. Knob portion 12 comprises a support 16 and a plurality of knob elements (hereinafter "knobs 20") protruding from support 16 at which cavity portion 14 is capable of being engaged. Cavity portion 14 comprises a support 22 having a plurality of cavities 30 at which knobs 20 are received. The selective engagement and disengagement of knob portion 12 and cavity portion 14 is controlled via an ionic polymer metal composite actuator disposed at each knob 20. The actuator effects a change in the shape orientation and/or flexural modulus property of the material of the ionic polymer metal composite actuator. Voltage applied from a power source 28 actuates the ionic polymer metal composite material to either maintain knobs 20 in their respective cavities 30 or provide disengagement from their respective cavities 30.

During engagement of portions 12, 14, either portion is biased in the direction of the other portion such that the facial surfaces (i.e., the surfaces having knobs 20 and cavities 30) are disposed in intimate contact with each other. Alternatively, both portions 12 14 may be simultaneously biased in the direction of the other portion to effect the intimate contact between the facial surfaces. The engagement of the facial surfaces and the activation of the ionic polymer metal composite creates an interfacial joint that is strong when one of the surfaces is subject to shear or subject to a pull force, but weaker when one of the surfaces is subject to a peeling force. A peeling force is a force that is concentrated in a localized region of adjacently-positioned knobs and results in the mechanical release of the knobs from their respective cavities in the localized region (as opposed to "pull-off," which is the simultaneous mechanical release of all of the knobs from the cavities over the engaged facial surfaces when the facial surfaces are biased in opposing directions and in directions orthogonal to the direction in which the interfacial engagement extends). Continuous application of the peeling force results in a wave-like travel of the release front across the interengaged facial surfaces. The force needed for the application of a peeling force is lower than the force needed for pull-off due to the fact that only a few knobs at a time are disengaged from their respective cavities in the former while all of the knobs are released simultaneously from their respective cavities in the latter. For example, when portions 12, 14 are pressed into facial engagement, knobs 20 engage with cavities 30 such that the close spacing of knobs 20 resists substantial lateral movement when subjected to shearing forces in the directions of the plane of engagement. Similarly, when the engaged facial surfaces are subjected to a force orthogonal to this plane (pull-off forces), knobs 20 resist substantial separation of portions 12, 14. However, when portions 12, 14 are subjected to a peeling force, knobs 20 can become more easily disengaged from cavities 30. In order to provide a point of leverage for separating portions 12, 14 using a peeling force, either support 16 or support 22 is preferably flexible.

Supports 16, 22 at which knob portion 12 and cavity portion 14 are respectively disposed may be rigid or flexible depending upon the application in which system 10 is intended to be used. Suitable materials for fabricating supports 16, 22 generally include non-conductive materials such as plastics, fabrics, and the like. For example, suitable plastics include thermoplastics and thermosets such as for example polypropylene, polyethylene, polyamide, polyester, polystyrene, polyvinyl chloride, acetal, acrylic, polycarbonate, polyphenylene oxide, polyurethane, polysulfone, phenol-formaldehyde resin, epoxy, silicone RTV, and other like polymers. Adhesives may be applied to surfaces of the supports (preferably opposite the surfaces at which knobs and cavities are disposed) for application of system 10 to an apparatus or structure. Alternatively, system 10 may be secured to an apparatus or structure by bolts, by welding, or any other mechanical securement means. It should be noted that, unlike other fasteners that typically require at least one support to be flexible so that a peeling force can be applied for separation of the opposing portions of the fastener, both supports 16, 22 could be fabricated from a rigid or inflexible material in view of the remote releasing capability provided.

Knobs 20 generally comprise either a random- or ordered arrangement of protruding members supported at or attached to the surface of support 16. Cavities 30 likewise generally comprise either a random- or ordered arrangement that corresponds to the knob arrangement.

Figure 2:
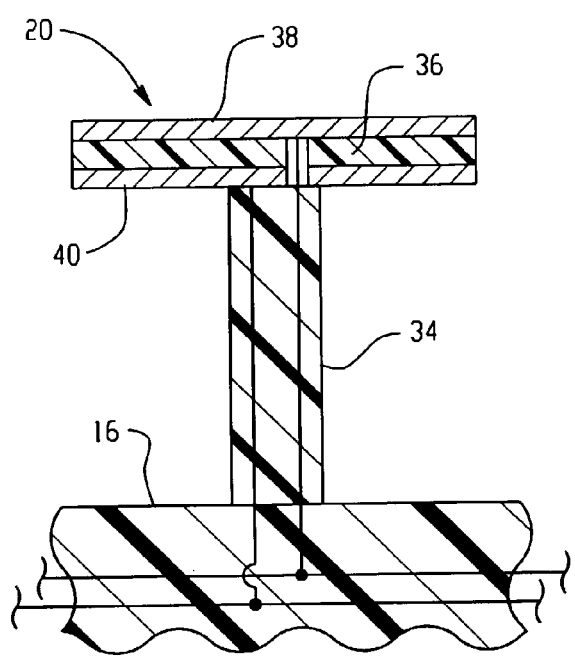
FIG. 2 is a cross-sectional view of a knob of the releasable fastening system of FIG. 1.

One exemplary embodiment of knob 20 is shown with reference to FIG. 2. Knob 20 comprises a post 34 and an ionic polymer metal composite actuator disposed at post 34. Post 34 is supported at support 16 and preferably extends in a substantially orthogonal direction from the surface of support 16 to provide structural support for knob 20. Alternately, the ionic polymer metal composite actuator may be disposed directly at support 16 and oriented to extend in a substantially orthogonal direction from the surface of support 16 such that the ionic polymer metal composite, when actuated, deforms to a hook or similar shape to engage a correspondingly configured cavity. In embodiments in which post 34 is incorporated, materials from which post 34 may be fabricated include, but are not limited to, polypropylene, polyethylene, polyamide, polyester, polystyrene, polyvinyl chloride, acetal, acrylic, polycarbonate, polyphenylene oxide, polyurethane, polysulfone, combinations of the foregoing materials, and the like.

The ionic polymer metal composite actuator comprises an ionic polymer metal composite (hereinafter "IPMC") element 36, a working electrode 38, and a counter electrode 40. The IPMC element 36 preferably comprises a film of solid polymer electrolyte material sandwiched between working electrode 38 and counter electrode 40. The solid polymer electrolyte material may be an ion-exchange resin such as, for example, a hydrocarbon- or a fluorocarbon-type resin. Preferably, the solid polymer electrolyte material is a fluorocarbon-type ion-exchange resin having sulfonic, carboxylic, and/or phosphoric acid functionality. Fluorocarbon-type ion-exchange resins may include hydrates of a tetrafluoroethylene-perfluorosulfonyl ethoxyvinyl ether or tetra fluoroethylene-hydroxylated (perfluoro vinyl ether) copolymers. Such resins typically exhibit excellent resistance to oxidation induced by contact with halogens, strong acids, and bases. Suitable fluorocarbon-type ion-exchange resins having sulfonic acid group functionality are available under the tradename NAFION® from E.I. DuPont de Nemours and Company in Wilmington, Del.

Both electrodes 38, 40 comprise sheets of material through which an electrical charge can be distributed. Materials from which electrodes 38, 40 can be fabricated include, but are not limited to, platinum, palladium, rhodium, iridium, ruthenium osmium, carbon, gold, tantalum, tin, indium, nickel, tungsten, manganese, and the like, as well as mixtures, oxides, alloys, and combinations comprising at least one of the foregoing materials. Preferably, electrodes 38, 40 comprise platinum. Furthermore, the sheets of material are preferably sufficiently flexible or collapsible to allow for their lateral insertion into the cavities. Both electrodes 38, 40 are also preferably disposed in electrical communication with the power source through insulated conduits (not shown) disposed within the internal structure of post 34.

Alternately, electrodes 38, 40 may be chemically disposed at opposing sides of IPMC element 36. Methods of chemically disposing the electrodes at the ion-exchange resin material include, but are not limited to, vapor deposition, plasma deposition, and the like. Still other methods of disposing the electrodes at IPMC element 36 include spraying the electrode material onto the resin material or selectively dipping the surfaces of the resin material into a solution containing ions of the metal from which the electrodes are to be fabricated.

Figure 3:
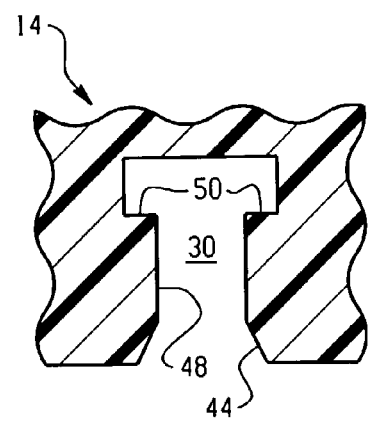
FIG. 3 is a cross-sectional view of a cavity of the releasable fastening system of FIG. 1.

Referring now to FIG. 3, cavity portion 14 is generally shown. Cavity portion 14 comprises a plurality of cavities 30, each cavity 30 being configured to receive its respective knob and to retain its knob at a surface therein upon actuation of the IPMC element. Cavity 30 comprises an opening having a fillet 44 formed or otherwise disposed at a mouth or exterior portion thereof. Preferably, fillet 44 comprises a chamfered surface angled to enhance the capture of a knob and to facilitate the insertion of the knob with a minimal amount of play between the knob and the chamfered surface. Cavity 30 further comprises an inner surface 48 at an intermediate portion thereof that defines a hole having a cross-sectional area that accommodates the post and the un-activated knob. An interior portion of the hole is defined by an abrupt change in cross-sectional area such that the sides of the interior portion are recessed to form a lip surface 50.

Figure 4:
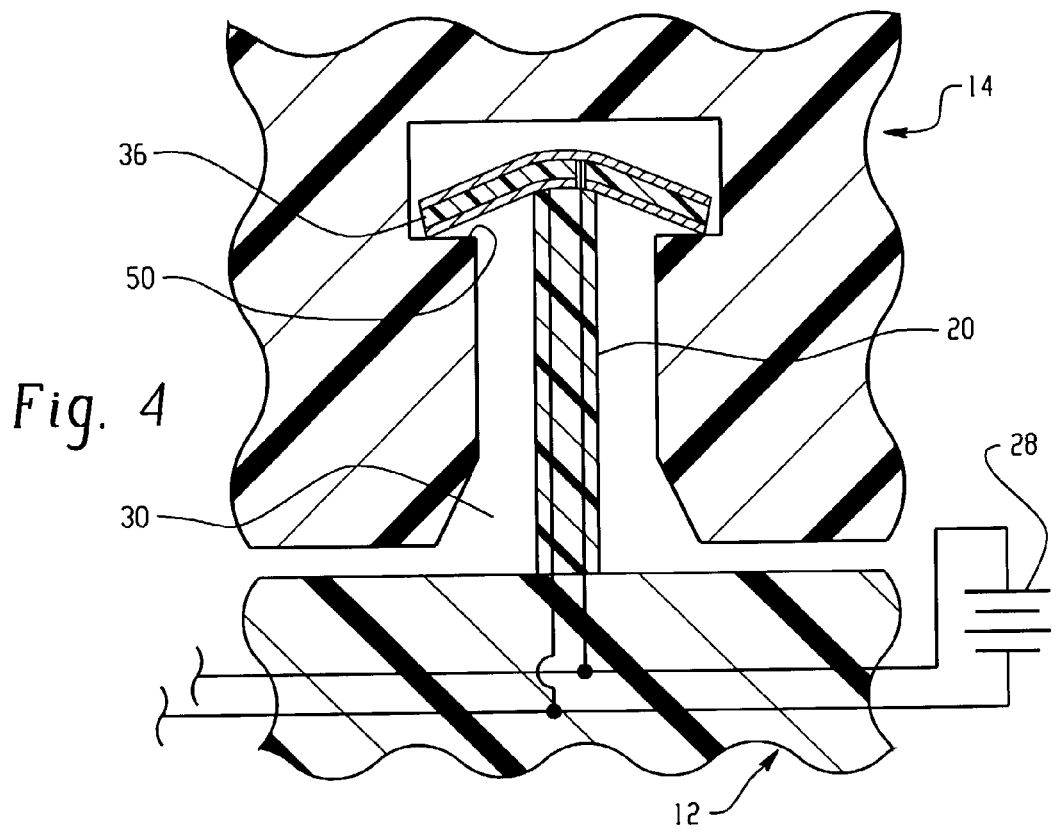
FIGS. 4 and 5 are schematic representations of the actuation of the releasable fastening system of FIG. 1 respectively illustrating the engagement and disengagement of the system.
Figure 5:
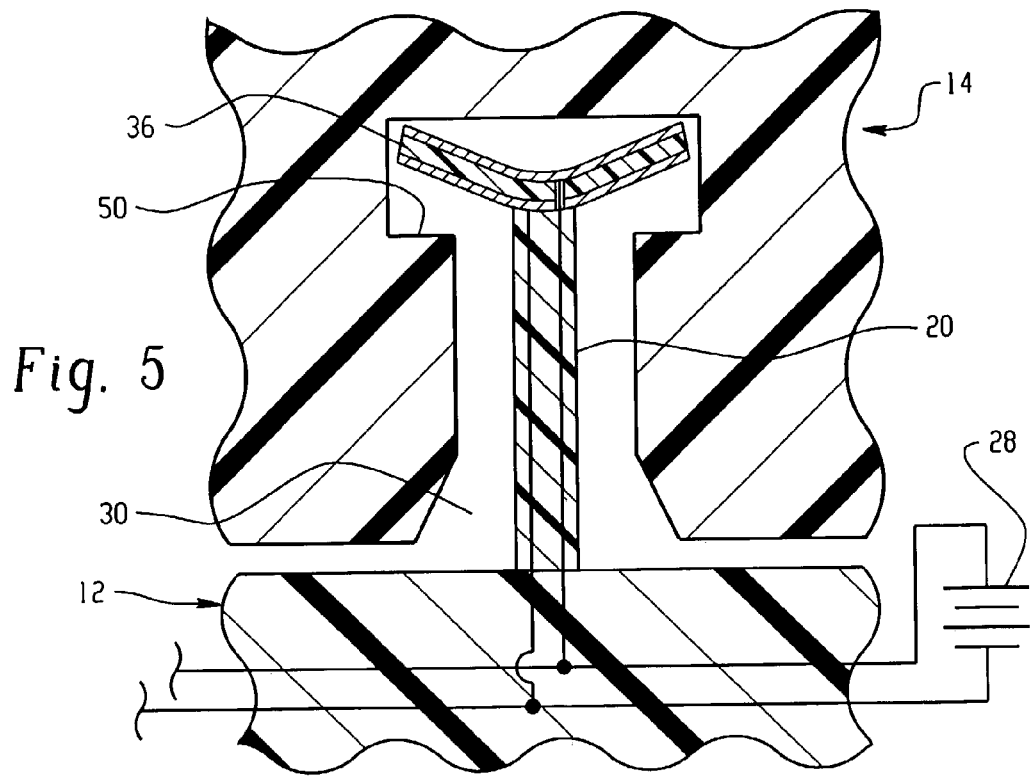

The engagement of knob 20 with cavity 30 is shown with reference to FIGS. 4 and 5. In either configuration of the engagement, knob portion 12 and cavity portion 14 are biased together to cause the mechanical interlock of knobs 20 at lip surface 50 of cavity 30. The application of a potential (voltage across the electrodes) in one direction from power source 28, as is shown in FIG. 4, causes the migration of anions in IPMC element 36 such that the solid polymer electrolyte material increases in volume at portions of the element proximate the interface of the positive electrode and IPMC element 36. The increase in volume causes the change in the shape orientation and/or flexural modulus property of the solid polymer electrolyte material by effecting the deformation of the solid polymer electrolyte material such that IPMC element 36 and its attendant electrodes are pulled in the direction of post 34, and the edges of the IPMC element/electrode assembly engage lip surface 50, thus "locking" knob 20 in cavity 30.

The application of a potential in the opposing direction, as is shown in FIG. 5, however, causes the migration of cations in IPMC element 36 such that the solid polymer electrolyte material increases in volume at portions of the element proximate the interface of the negative electrode and IPMC element 36. A volumetric increase at this interface results in the deformation of the solid polymer electrolyte material such that IPMC element 36 and its attendant electrodes are pulled away from the direction in which post 34 extends, and the edges of the IPMC element/electrode assembly disengage lip surface 50, thus releasing knob 20 and dramatically decreasing the force required to mechanically disengage portions 12, 14.

EXAMPLE

An IPMC element/electrode assembly for use in a releasable fastening system comprises a membrane of fluorocarbon-type ion-exchange resin having sulfonic acid functionality and opposing electrodes fabricated from a noble metal disposed at opposing surfaces of the membrane. The surfaces of the membrane at which the electrodes are to be deposited are roughened using fine glass beads to increase the surface area of the membrane for electrode attachment and then thoroughly cleaned with an aqueous detergent using an ultrasonic cleaner. The membrane is then boiled in 2 molar (M) hydrochloric acid for 30 minutes and rinsed with deionized water to remove impurities and ions.

The deposition of the metal is effected by room-temperature, overnight immersion of the membrane in a 2 milligrams (mg) of platinum per milliliter (ml) solution of platinum ammonium chloride (e.g., $[PtNH_3)_4]Cl_2$ or $[Pt(NH_3)_6]Cl_4$), preferably containing greater than about 3 milligrams (mg) of platinum per square centimeter ($cm^2$) of membrane surface area. The membrane is then neutralized in this solution by adding 5% ammonium hydroxide and maintaining the membrane at room temperature in the solution for several hours. Metal ions deposited onto the membrane are then reduced by placing the membrane in a stirred 5 weight percent (wt %) aqueous solution of sodium borohydride at 40 degrees centigrade. The temperature of the resulting mixture is raised to about 60 degrees centigrade and maintained at that temperature for about 1.5 hours to complete the reduction of the metal ions. The membrane is then rinsed with water and immersed in 0.1 M hydrochloric acid for about one hour. Further deposition of metal is accomplished by re-immersing the membrane in platinum ammonium chloride solution (typically containing 0.5 mg of platinum per milliliter of solution in a manner similar to that described above. The deposited metal is then reduced with a 5% aqueous solution of hydroxylamine hydrochloride and a 20% solution of hydrazine at 40° C., with final reduction at 60° C.

Finally, the IPMC element/electrode assembly is rinsed with water and boiled in dilute hydrochloric acid to remove the ammonium cation deposited on the membrane. The hydrogen ion in the IPMC can be chemically exchanged for any desired cation by immersing the IPMC in a solution of the chloride salt of the desired cation.

The releasable fastening system as described above is extremely versatile and can be utilized in a wide variety of applications. For example, the releasable fastening system can be employed to releasable attach two or more automotive structural elements together. Welded and adhesively bonded "rigid" attachments provide fixed load paths. By applying or removing an electrostatic charge to the components of a system, however, load paths can be selectively created or eliminated. The selective creation of a load path may provide an additional force to maintain the integrity of a structure subjected to a stressing force, and the selective elimination of the load path may be used to provide for the controlled failure of a structure when subjected to a stressing force. Other examples include providing a mechanism for opening and closing apparatus such as trunks, doors, glove box, and the like. The releasable fastening system may also be employed for releasable on-demand attachment mechanisms such as for releasable attachment for batteries, fuels cells, cargo containers, vehicle interior and exterior components, and the like. Moreover, the releasable fastening systems can be configured such that an energy source is not required to maintain engagement of the joint. Energy, i.e., the signal supplied by the actuation device, can be used to provide separation, thereby minimizing the impact on energy sources during use of the releasable fastening system.

While the invention has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this disclosure, but that the disclosure will include all embodiments falling within the scope of the appended claims.

What is claimed is:

1. A releasable fastening system, comprising:
a knob portion comprising a knob element;
a cavity portion comprising a cavity configured to receive said knob element; and
an ionic polymer metal composite actuator disposed at said knob element, said ionic polymer metal composite actuator being operable to mechanically interlock said knob element with said cavity.

2. The releasable fastening system of claim 1, further comprising a power source disposed in electrical communication with said ionic polymer metal composite actuator.

3. The releasable fastening system of claim 1, wherein said ionic polymer metal composite actuator comprises an electrolytically-actuatable solid polymer electrolyte material.

4. The releasable fastening system of claim 3, wherein said solid polymer electrolyte material is an ion-exchange resin.

5. The releasable fastening system of claim 1, wherein said cavity comprises a lip surface at which said ionic polymer metal composite actuator is engagable.

6. A releasable fastening system, comprising:
- a knob portion comprising a knob element and a first support member at which said knob element is supported or attached;
- a cavity portion comprising a cavity configured to receive said knob element and a second support member at which said cavity is disposed; and
- an ionic polymer metal composite actuator disposed at said knob element, said ionic polymer metal composite actuator comprising a solid polymer electrolyte material, a first electrode disposed at a first surface of said solid polymer electrolyte material, and a second electrode disposed at a second surface of said solid polymer electrolyte material, said ionic polymer metal composite actuator being electrically operable to engage a surface of said cavity to retain said knob element at said cavity.

7. The releasable fastening system of claim 6, wherein said knob element comprises a post configured to be received in said cavity, said post being supported at or attached to said first support member at one end of said post.

8. The releasable fastening system of claim 6, wherein said first electrode is laterally supported at one end of said knob element, said solid polymer electrolyte material is disposed at said first electrode, and said second electrode is supported at an opposing side of said solid polymer electrolyte material.

9. The releasable fastening system of claim 6, wherein said cavity comprises a chamfered surface at an exterior portion thereof.

10. The releasable fastening system of claim 6, wherein said cavity comprises an interior portion defined by an abrupt change in cross-sectional area from an intermediate portion, said interior portion comprising recessed sides that define a lip surface at which said ionic polymer metal composite actuator is engagable.

11. The releasable fastening system of claim 6, wherein said solid polymer electrolyte material comprises a fluorocarbon-type ion exchange resin having sulfonic acid group functionality.

12. A releasable fastening system, comprising:
- a knob portion comprising an ionic polymer metal composite actuator, said ionic polymer metal composite actuator comprising a solid polymer electrolyte material, a first electrode disposed at said solid polymer electrolyte material, and a second electrode disposed at said solid polymer electrolyte material; and
- a cavity portion comprising a cavity configured to receive said ionic polymer metal composite actuator of said knob portion.

13. The releasable fastening system of claim 12, wherein said cavity comprises a chamfered surface at an exterior portion thereof through which said knob portion is received said a lip portion at an interior portion thereof at which said knob portion is engagable.

14. The releasable fastening system of claim 12, wherein said solid polymer electrolyte material comprises a fluorocarbon-type ion exchange resin having sulfonic acid group functionality.

15. The releasable fastening system of claim 12, wherein said electrodes are fabricated from a material selected from the group consisting of platinum, palladium, rhodium, iridium, ruthenium, osmium, carbon, gold, tantalum, tin, indium, nickel, tungsten, manganese, and combinations of the foregoing materials.

16. A releasable fastening system, comprising:
- a knob portion comprising a plurality of knob elements;
- a cavity portion comprising a plurality of cavities configured to receive said knob elements; and
- an ionic polymer metal composite actuator disposed at each of said knob elements, said ionic polymer metal composite actuators being operable to mechanically interlock said knob elements with said cavities.

* * * * *